(12) United States Patent
Rippel et al.

(10) Patent No.: US 10,790,728 B2
(45) Date of Patent: *Sep. 29, 2020

(54) ELECTRIC MACHINE STATOR WITH LIQUID COOLED TEETH

(71) Applicant: ENURE, INC., Los Angeles, CA (US)

(72) Inventors: Wally E. Rippel, Altadena, CA (US); Eric Rippel, Los Angeles, CA (US)

(73) Assignee: Enure, Inc., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/505,494

(22) Filed: Jul. 8, 2019

(65) Prior Publication Data

US 2019/0334413 A1 Oct. 31, 2019

Related U.S. Application Data

(63) Continuation of application No. 15/010,879, filed on Jan. 29, 2016, now Pat. No. 10,411,563.

(Continued)

(51) Int. Cl.
*H02K 9/19* (2006.01)
*H02K 1/20* (2006.01)

(52) U.S. Cl.
CPC .............. *H02K 9/19* (2013.01); *H02K 1/20* (2013.01)

(58) Field of Classification Search
CPC ............. H02K 1/20; H02K 1/32; H02K 9/19

(Continued)

(56) References Cited

U.S. PATENT DOCUMENTS

| 1,877,904 A | 9/1932 | Laffoon |
| 2,433,660 A | 12/1947 | Granfield |

(Continued)

FOREIGN PATENT DOCUMENTS

| CN | 102510141 A | 6/2012 |
| CN | 102538562 B | 8/2013 |

(Continued)

OTHER PUBLICATIONS

German Patent and Trademark Office Notification of the First Office Action, for Patent Application No. 11 2016 000 531.8, dated Jun. 19, 2019, 8 pages.

(Continued)

*Primary Examiner* — Thomas Truong
(74) *Attorney, Agent, or Firm* — Lewis Roca Rothgerber Christie LLP

(57) ABSTRACT

A system for cooling the teeth of an electric machine stator. The stator includes a stator core that may be formed of a plurality of laminations. Each lamination has a plurality of back iron apertures, a plurality of tooth tip apertures, and a plurality of elongated apertures. When the laminations are assembled to form the stator core, the back iron apertures align to form back iron inlet channels and back iron outlet channels, and the tooth tip apertures align to form tooth tip cooling channels. The elongated apertures are L-shaped and connect the back iron inlet channels and back iron outlet channels to the tooth tip channels. Cooling fluid may flow, for example, axially through a back iron inlet channel, azimuthally and radially inward through an elongated aperture to a tooth tip, axially along a tooth tip channel, and to a back iron outlet channel through another elongated aperture.

26 Claims, 13 Drawing Sheets

Related U.S. Application Data

(60) Provisional application No. 62/110,314, filed on Jan. 30, 2015.

(58) Field of Classification Search
USPC ..................................... 310/52, 54, 58, 59
See application file for complete search history.

(56) References Cited

U.S. PATENT DOCUMENTS

| | | | |
|---|---|---|---|
| 2,774,000 A | 12/1956 | Ross | |
| 2,792,511 A | 5/1957 | Horstman | |
| 3,165,655 A | 1/1965 | Eis | |
| 3,206,964 A | 9/1965 | Hart et al. | |
| 3,288,209 A | 11/1966 | Wall et al. | |
| 3,447,002 A | 5/1969 | Ronnevig | |
| 3,498,370 A | 3/1970 | Baggs | |
| 3,597,645 A | 8/1971 | Duffert | |
| 3,827,141 A | 8/1974 | Hallerback | |
| 3,896,320 A | 7/1975 | Moffatt | |
| 4,208,597 A | 6/1980 | Mulach et al. | |
| 4,672,252 A | 6/1987 | Spirk | |
| 4,993,487 A | 2/1991 | Niggemann | |
| 5,325,684 A | 7/1994 | Stierlin et al. | |
| 5,859,482 A | 1/1999 | Crowell et al. | |
| 6,762,520 B1 * | 7/2004 | Ehrhart | H02K 1/20 310/208 |
| 6,954,010 B2 | 10/2005 | Rippel et al. | |
| 7,057,324 B2 | 6/2006 | Breznak et al. | |
| 7,851,966 B2 | 12/2010 | Rippel | |
| 8,405,262 B1 | 3/2013 | Beatty et al. | |
| 10,411,563 B2 * | 9/2019 | Rippel | H02K 9/19 |
| 2004/0012294 A1 * | 1/2004 | Rippel | H02K 1/20 310/60 A |
| 2005/0115699 A1 | 6/2005 | Nuris et al. | |
| 2007/0013241 A1 * | 1/2007 | Schiferl | H02K 1/32 310/54 |
| 2009/0113696 A1 | 5/2009 | Holmes | |
| 2009/0195092 A1 | 8/2009 | Gagnon | |
| 2009/0195108 A1 | 8/2009 | Rippel | |
| 2010/0127810 A1 * | 5/2010 | Rippel | H01F 27/025 336/61 |
| 2011/0094720 A1 | 4/2011 | Wang et al. | |
| 2011/0254391 A1 | 10/2011 | Elender et al. | |
| 2012/0080964 A1 | 4/2012 | Bradfield | |
| 2012/0080983 A1 | 4/2012 | Iund | |
| 2012/0086291 A1 | 4/2012 | DeBlock et al. | |
| 2012/0267971 A1 | 10/2012 | Husum et al. | |
| 2013/0049496 A1 | 2/2013 | Chamberlin et al. | |
| 2013/0069455 A1 | 3/2013 | Hamer et al. | |
| 2013/0113311 A1 | 5/2013 | Downing et al. | |
| 2013/0119816 A1 | 5/2013 | Yang et al. | |
| 2014/0042841 A1 | 2/2014 | Rippel et al. | |
| 2015/0280525 A1 | 10/2015 | Rippel et al. | |
| 2016/0025421 A1 | 1/2016 | Rippel et al. | |
| 2016/0087509 A1 | 3/2016 | Rippel et al. | |

FOREIGN PATENT DOCUMENTS

| | | |
|---|---|---|
| DE | 33 34 501 A1 | 3/1984 |
| DE | 34 44 189 A1 | 9/1985 |
| EP | 0 155 405 A1 | 9/1985 |
| GB | 2484386 A | 4/2012 |
| JP | 53-054706 | 5/1978 |
| JP | 54-005011 U1 | 1/1979 |
| JP | 55-128463 | 10/1980 |
| JP | 62-019049 U1 | 2/1987 |
| JP | 06-054469 A | 2/1994 |
| JP | H 09-215270 A | 8/1997 |
| JP | H 10-271716 | 10/1998 |
| JP | 2000-232740 A | 8/2000 |
| JP | 2002-153008 A | 5/2002 |
| JP | 2003-088014 A | 3/2003 |
| JP | 2003-134701 A | 5/2003 |
| JP | 2004-215495 A | 7/2004 |
| JP | 2004-236495 A | 8/2004 |
| JP | 2005-185014 A | 7/2005 |
| JP | 2005-333697 A | 12/2005 |
| JP | 2007-209070 A | 8/2007 |
| JP | 2010-268677 A | 11/2010 |
| JP | 2014-103770 | 6/2014 |
| JP | 2014-165992 A | 9/2014 |
| JP | 2014-183602 A | 9/2014 |
| WO | WO 01/05015 A2 | 1/2001 |

OTHER PUBLICATIONS

Chinese Notification of the First Office Action, for Patent Application No. 201680007570.0, dated Dec. 19, 2018, 11 pages.

Examination Report, with English translation, issued in KR 10-2017-7021617, dated Mar. 2, 2018, 14 pages.

Invitation to Pay Additional Fees and, Where Applicable, Protest Fee for related International Patent Application No. PCT/US2015/021453 dated Jun. 15, 2015 (9 pages).

International Search Report and Written Opinion for related International Patent Application No. PCT/US2015/0021453, dated Aug. 14, 2015 (19 pages).

International Search Report and Written Opinion for related International Patent Application No. PCT/US2015/041824, dated Oct. 23, 2015 (9 pages).

International Search Report and Written Opinion for related International Patent Application No. PCT/US2015/050649; dated Dec. 10, 2015 (11 pages).

International Search Report and Written Opinion for related International Patent Application No. PCT/US2016/015700, dated Apr. 1, 2016 (9 pages).

Japanese Notice of Reasons for Rejection, for Patent Application No. 2017-540141, dated Jun. 27, 2018, dated Jul. 3, 2018, 5 pages.

Korean Notice of Preliminary Rejection, for Patent Application No. 10-2017-7021617, dated Jul. 20, 2018, 3 pages.

Partial English translation of the Chinese Notification of the First Office Action, for Patent Application No. 201680007570.0, dated Dec. 19, 2018, 15 pages.

Partial English translation of the Japanese Notice of Reasons for Rejection, for Patent Application No. 2017-540141, dated Jun. 27, 2018, dated Jul. 3, 2018, 10 pages.

Partial English translation of the Korean Notice of Preliminary Rejection, for Patent Application No. 10-2017-7021617, dated Jul. 20, 2018, 1 page.

Indian Patent Office Examination Report, for Patent Application No. 201717024825, dated May 16, 2019, 7 pages.

Chinese Notification of the Second Office Action, for Patent Application No. 201680007570.0, dated Oct. 18, 2019, 3 pages.

Japanese Notification of the Decision of Final Rejection, for Patent Application No. 2017-540141, dated May 14, 2019, 5 pages.

Partial English translation of the Chinese Notification of the Second Office Action, for Patent Application No. 201680007570.0, dated Oct. 18, 2019, 6 pages.

Partial English translation of the Japanese Notification of the Decision of Final Rejection, for Patent Application No. 2017-540141, dated May 14, 2019, 8 pages.

* cited by examiner

ELECTRIC MACHINE STATOR WITH LIQUID COOLED TEETH

CROSS-REFERENCE TO RELATED APPLICATION(S)

The present application is a continuation of U.S. patent application Ser. No. 15/010,879, filed Jan. 29, 2016, entitled "ELECTRIC MACHINE STATOR WITH LIQUID COOLED TEETH", which claims priority to and the benefit of U.S. Provisional Application No. 62/110,314, filed Jan. 30, 2015, entitled "ELECTRIC MACHINE STATOR WITH TRANSVERSE LIQUID COOLED TEETH"; the entire contents of both of the applications identified in this paragraph are incorporated herein by reference.

FIELD

One or more aspects of embodiments according to the present invention relate to electric machines, and more particularly to a system for cooling an electric machine stator.

BACKGROUND

The continuous power to mass ratio (specific power) is an important metric for electric motors, especially for those used to power electric and hybrid vehicles. As this parameter is increased, motor mass can be reduced while maintaining a given level of performance. This provides both direct and indirect economic benefits. Since power is equal to torque times speed (rpm), high specific power may be achieved by the combination of high shaft speed and high torque per unit mass (high specific torque). Since electrical and core magnetic frequencies may be proportionate to shaft speed and since magnetic losses may increase approximately with the square of these frequencies, core losses may increase rapidly with increasing speed. Likewise, since winding losses may be approximately proportional to the square of the torque, this loss component may increase rapidly with increasing torque. As a result, the operation of high specific power machines may be facilitated by efficient heat rejection for both the core and the winding.

Winding temperature may exceed the core temperature, and elevated winding temperatures may cause increased winding losses. Accordingly, a metric may be defined which involves winding hot-spot temperature and total loss within the stator. This metric, the stator thermal resistance, is defined as the temperature difference between the hottest part of the stator winding and the cooling medium (e.g. inlet coolant) divided by the total stator heat dissipation. As the stator thermal resistance is lowered, the continuous power capability and hence continuous power rating of the overall machine may increase. As such, low stator thermal resistance may be helpful in achieving high specific power.

In a related art liquid-cooled stator, the active core may be contained within a liquid cooled enclosure and the winding may be electrically insulated from the core via slot liners and electrical varnish. Heat produced within the winding may be constrained to flow through a series of elements, such as electrical varnish and slot liners, each adding thermal resistance, before reaching coolant which flows within the enclosure. Both electrical varnish and slot liners may offer significant thermal resistances. Heat is received by the core teeth and flows radially through the back iron and on to the enclosure.

For large diameter machines, both the tooth and back iron thermal resistances may be significant. The interface between the core and the enclosure may present yet another resistance element, as may the material of the enclosure itself. An additional resistance element is associated with heat transfer from the interior surfaces of the enclosure to the coolant. The combination of such thermal resistance elements may limit the performance of a motor. The temperature of the stator, and particularly the temperature of the stator teeth tips, may also affect the rotor, which may exchange heat with the stator by conduction, convection, and radiation heat transfer.

Thus, there is a need for an improved system for cooling a stator of an electric motor.

SUMMARY

According to an embodiment of the present invention there is provided an electric machine stator having an axis and including: a stator core having a plurality of layers, each of the layers having a back iron portion and a plurality of teeth, a tooth of the plurality of teeth of a first layer of the plurality of layers having a first aperture forming a first portion of a fluid channel.

In one embodiment, a layer adjacent the first layer has an aperture overlapping the first aperture.

In one embodiment, the first portion of the fluid channel extends radially within the tooth.

In one embodiment, the first portion of the fluid channel has a dimension in an axial direction equal to a thickness of a layer of the plurality of layers.

In one embodiment, the first portion of the fluid channel has a first segment in a direction having a radial component with respect to the axis and a second segment in a direction having an azimuthal component with respect to the axis.

In one embodiment, the stator core has a total volume, and the stator core has a plurality of fluid channels, including the fluid channel, having a total fluid contact area, and the total volume divided by the total fluid contact area is less than one inch.

In one embodiment, the first layer has a second aperture having a mirror-image shape of the first aperture.

In one embodiment, a second layer of the plurality of layers has the same shape as the first layer of the plurality of layers.

In one embodiment, the back iron portion of each of the layers has a plurality of second apertures, and the second apertures overlap on adjacent layers to form a plurality of substantially axial fluid passages.

In one embodiment, the first aperture overlaps one of the second apertures.

In one embodiment, the stator includes a flow director configured to direct fluid flow into, or receive fluid flow from, a subset of the plurality of substantially axial fluid passages.

In one embodiment, the flow director is a layer at one end of the stator core.

In one embodiment, the fluid channel includes: a first axial segment through the back iron portion of a first subset of the plurality of layers; a first azimuthal segment in the back iron portion of the first layer; a first radial segment being the first portion of the fluid channel; a second axial segment extending through a respective tooth of each of a second subset of the plurality of layers; a second radial segment within a tooth of a second layer of the plurality of layers; a second azimuthal segment in the back iron portion of the second layer; and a third axial segment through the back iron portion of a third subset of the plurality of layers.

In one embodiment, the plurality of layers is a plurality of laminations.

In one embodiment, the plurality of layers is a plurality of turns of an edge-wound strip.

In one embodiment, the plurality of layers is a plurality of turns of a face-wound strip.

In one embodiment, the teeth of the plurality of teeth are narrower at a first end of the strip than at a second end of the strip, and wherein a width of a slot between adjacent teeth at the first end of the strip is the same as a width of a slot between adjacent teeth at the second end of the strip.

In one embodiment, each tooth of the plurality of teeth of each of the plurality of layers extends radially inward from the back iron portion.

In one embodiment, each tooth of the plurality of teeth of each of the plurality of layers extends radially outward from the back iron portion.

In one embodiment, the electric machine includes: a stator winding; and an electrically insulating resin having a thermal conductivity greater than about 0.4 W/m/° C., wherein the resin fills, with a void fraction less than about 10%, a space between the stator core and the stator winding, and/or a gap between a pair of adjacent layers of the plurality of layers.

In one embodiment, the electric machine includes a sealing compound in a gap between two adjacent layers of the plurality of layers.

In one embodiment, each of the plurality of layers has an aperture, of a plurality of apertures, in a tip of a respective tooth, wherein the plurality of apertures includes the first aperture, and wherein the apertures of the plurality of apertures overlap to form a second portion of a fluid channel, the second portion of the fluid channel comprising the first portion of the fluid channel, and the second portion of the fluid channel being substantially axial In one embodiment, all of the layers of the plurality of layers are identical, and each layer of the plurality of layers is clocked by one tooth pitch relative to an adjacent layer.

According to an embodiment of the present invention there is provided an electric machine including: a rotor having an axis of rotation; and a stator having an axis, the axis of the stator being the axis of rotation of the rotor, the stator having: a stator core having a plurality of layers, each of the layers having a back iron portion and a plurality of teeth, a tooth of the plurality of teeth of a first layer of the plurality of layers having a first aperture forming a first portion of a fluid channel.

According to an embodiment of the present invention there is provided an electric machine including: a rotor; a stator having a stator core having a plurality of teeth; channel means for channeling a fluid through the teeth of the stator core; and pumping means for supplying the fluid to the channel means.

BRIEF DESCRIPTION OF THE DRAWINGS

These and other features and advantages of the present invention will be appreciated and understood with reference to the specification, claims, and appended drawings wherein:

FIGS. 2A-2B and 5A-5B are each drawn to scale for a respective embodiment.

DETAILED DESCRIPTION

The detailed description set forth below in connection with the appended drawings is intended as a description of exemplary embodiments of an electric machine stator with transverse liquid cooled teeth provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Some embodiments of the present invention eliminate or reduce thermal resistances such that the overall winding to coolant thermal resistance is significantly reduced—thus enabling a significant increase in continuous specific power. More specifically, in some embodiments coolant is introduced within the stator core teeth such that heat transfer path lengths are held to very small values and such that coolant head losses are also maintained to relatively low values.

Figure 1A:
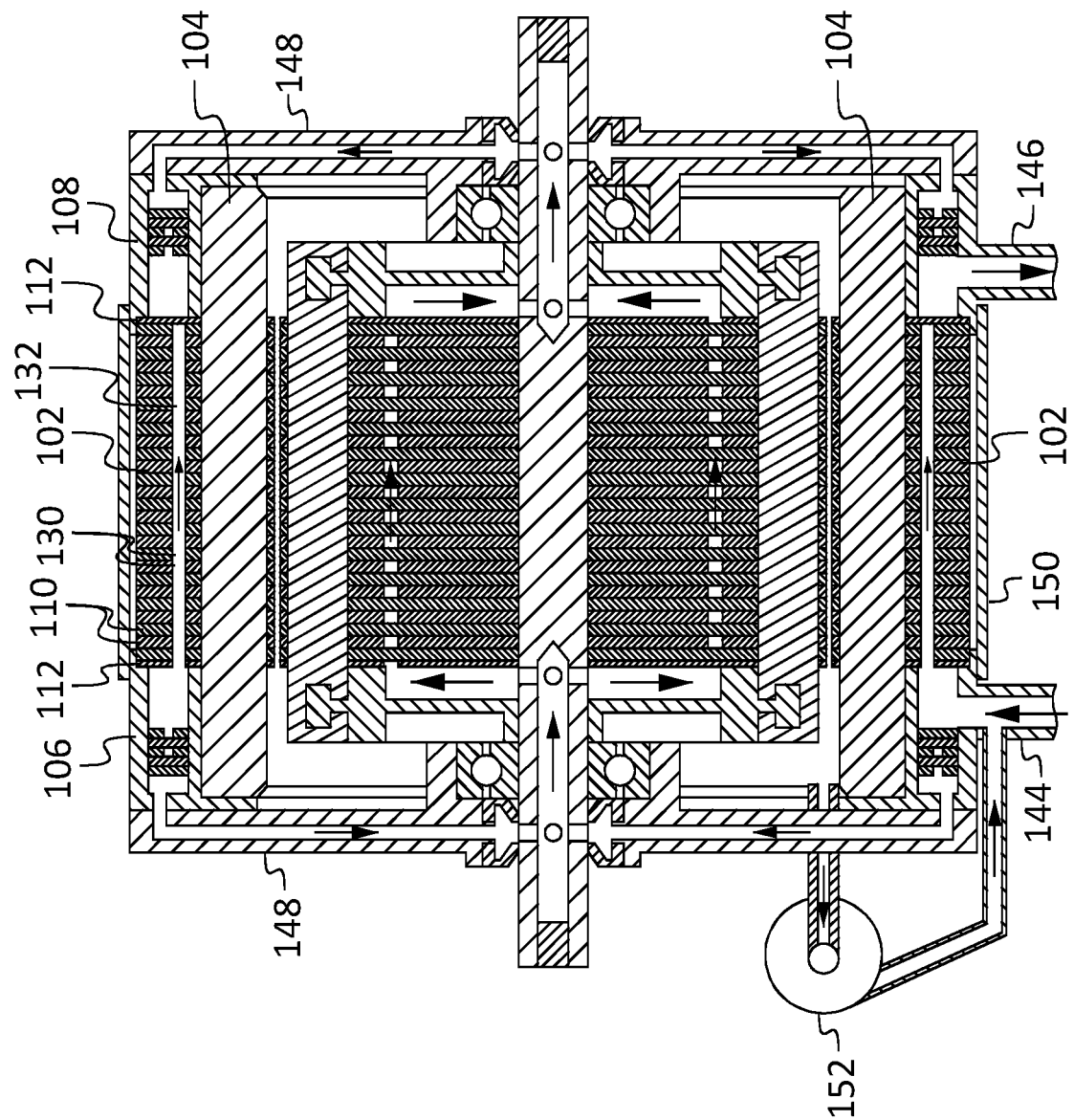
FIG. 1A is a cross-sectional view of an electric machine, according to an embodiment of the present invention.

Referring to FIG. 1A, in one embodiment the stator consists of magnetic stator core 102, winding 104, inlet manifold 106, and outlet manifold 108. In turn, stator core 102 consists of stacked interior laminations 110 and end laminations 112. Back iron apertures 130 (in the back iron of the stator core) overlap to form back iron channels 132. The cross section of FIG. 1A is taken through a winding slot in the upper portion of the stator core 102, and through an opposite winding slot in the lower portion of the stator core 102.

Figure 1B:
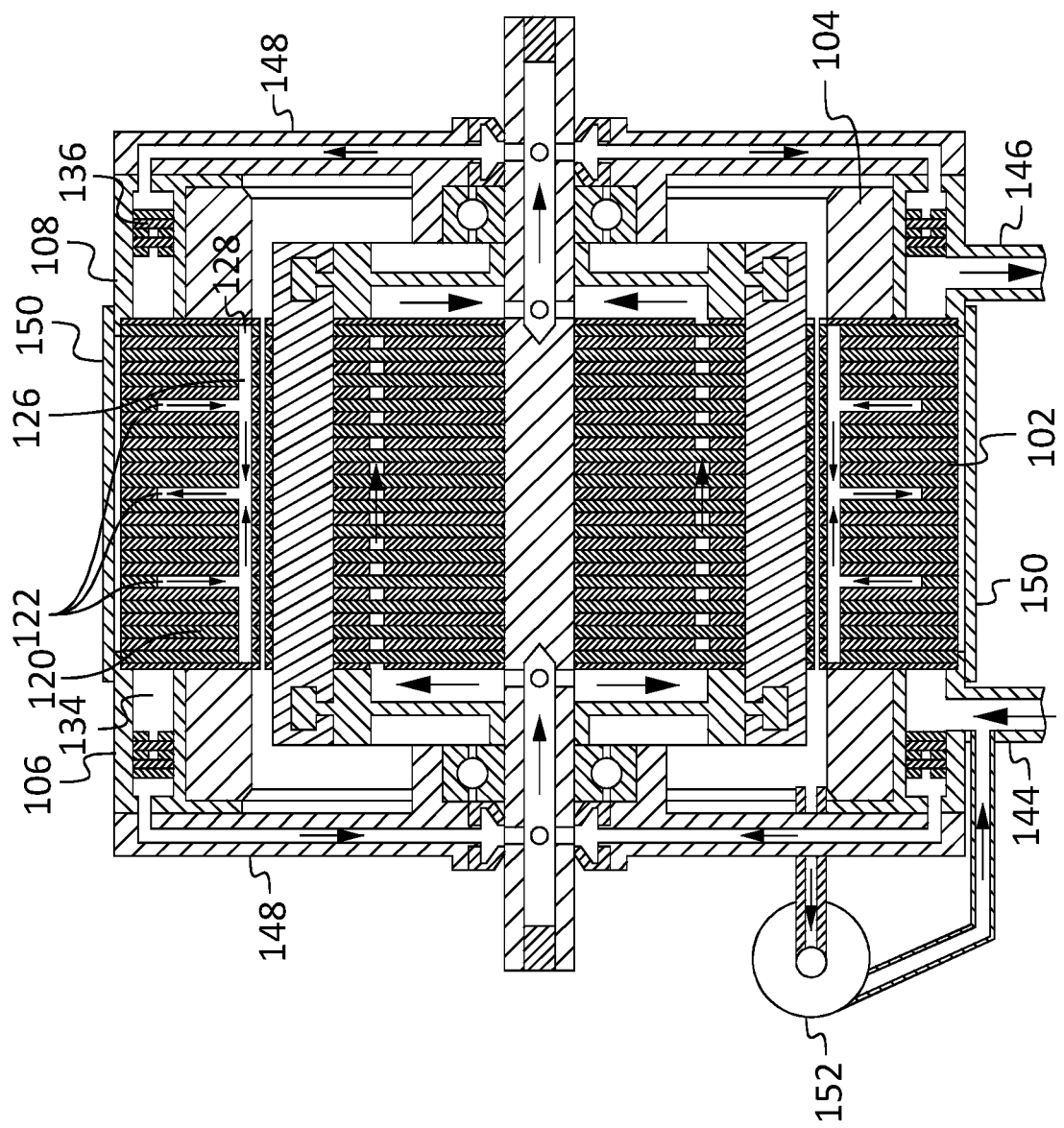
FIG. 1B is another cross-sectional view of an electric machine, according to an embodiment of the present invention.

FIG. 1B is a cross section taken through the center of a tooth 120 in the upper portion of the stator core 102, and through the center of an opposite tooth in the lower portion of the stator core 102. In FIG. 1B, a plurality of elongated apertures 122, each of which extends radially into a stator tooth at the location of one lamination, are visible in cross section. Moreover, each tooth which does not include a radial portion of one of the elongated apertures 122 contains a tooth tip aperture 126; the tooth tip apertures 126 align, when the interior laminations 110 are stacked, to form axial tooth tip channels 128. As used herein, the "axis" of a stator for a rotary motor is the axis of rotation that a rotor used with such a stator will have, and the "axial" direction is parallel to this axis. The embodiment of FIGS. 1A and 1B shows a motor having a rotor inside the stator; in other embodiments the stator may instead be inside the rotor.

The channels in the stator may act as fluid channels; cooling fluid may circulate through the channels to cool the stator. Cooling fluid, or "coolant", may be supplied, (e.g., from a cooling fluid pump) to the motor at a cooling inlet 144 and may return (e.g., to a cooling fluid reservoir, via a heat exchanger) through a cooling outlet 146. The same cooling fluid may also cool the rotor via a cooling circuit that may be in parallel with the stator cooling circuit as shown, and that may be connected to cooling channels in the rotor through rotary fluid couplings connected to the shaft of the rotor as shown. The motor may be sealed, e.g., by two end bells 148 and a sealing sleeve 150 each of which may seal against the inlet manifold 106 and/or the outlet manifold 108.

In some applications, functional elements of the motor may be part of an associated element and vice versa. For example, if the motor is coupled to and drives a gear box, a gear pinion may be an integral part of the rotor shaft, while the corresponding bearing is part of the gear box. In a like manner, it is possible that one or both of the fluid couplings or one or both stator manifolds are parts of external elements, such as gear boxes, inverters, or tandem machines. In one embodiment the electric machine is a permanent magnet machine with a permanent magnet rotor, and the stator includes some or all of the features described herein. In one embodiment a gearbox that is part of or coupled to the electric machine includes, or supports, an inlet manifold 106 or outlet manifold 108, an end bell, a bearing, and/or a fluid coupling.

Each manifold 106, 108 includes a cavity 134 which communicates with a respective subset of the back iron channels 132. The cavity 134 may contain heat transfer elements 136 which enhance heat transfer between the manifold material and the coolant. These elements may be, or include, for example, fins, ribs, or stacked laminations which include fluid channels. Each manifold 106, 108 is sealed to a respective face of the stator core 102 using a gasket, O-rings or a sealant. In one embodiment, the two manifolds are drawn together by two or more tie rods (not shown). The manifolds may also provide cooling for the winding end turns. Significantly better cooling may be possible where the manifold cavity contains a multi-layered cooling element which has a large area in contact with the cooling fluid.

Figure 2A:
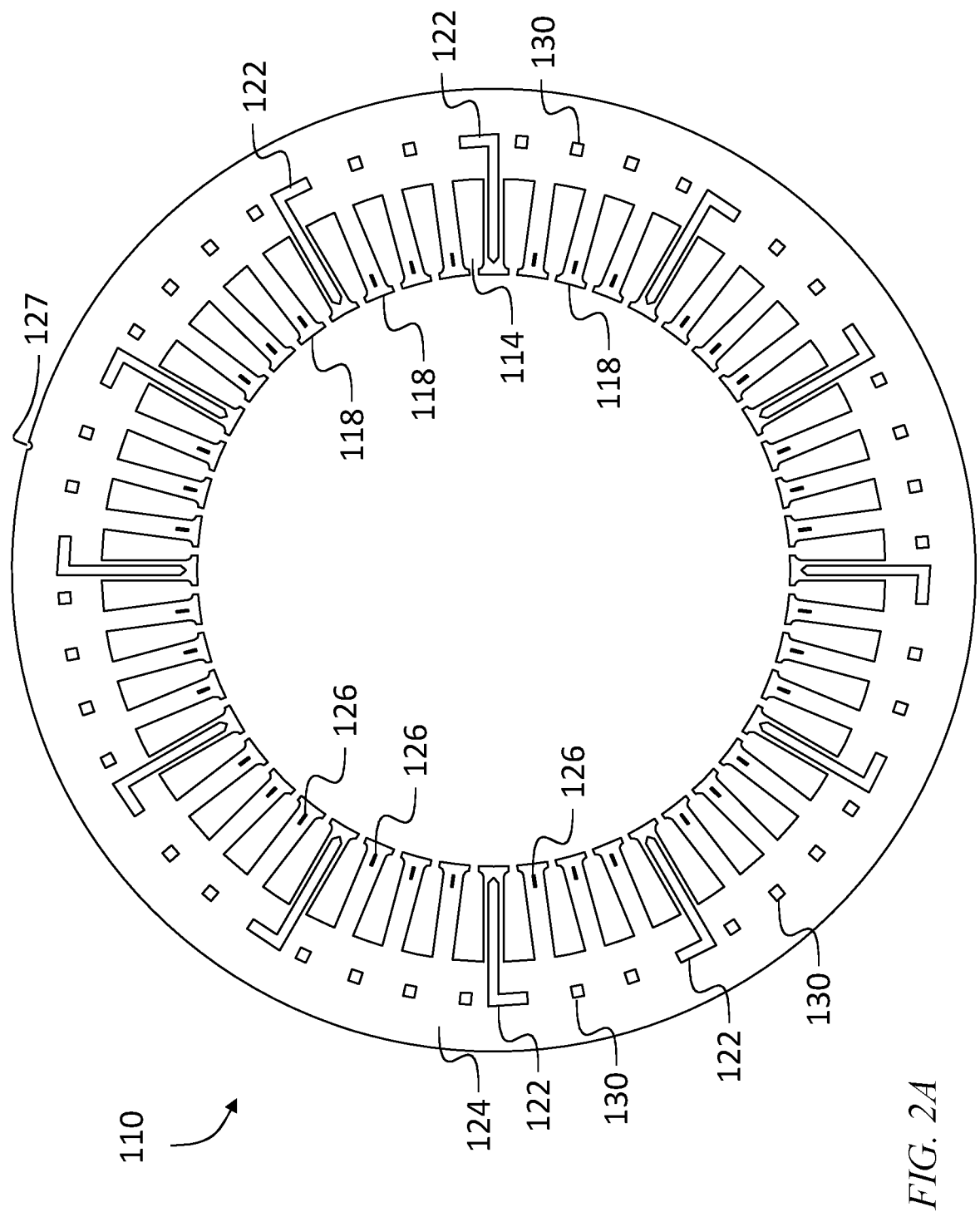
FIG. 2A is a plan view of a stator lamination, according to an embodiment of the present invention.

FIG. 2A shows the design of the interior laminations 110 in one embodiment. Each interior lamination 110 contains lamination slots 114 which align, when the interior laminations 110 are stacked, to form winding channels which in turn receive winding 104. Likewise, lamination teeth 118 align, when the interior laminations 110 are stacked, to form teeth 120. Every $n^{th}$ lamination tooth 118 (where n=4 in the embodiment of FIG. 2A) includes an elongated aperture 122 which extends into a back iron portion 124 of the interior lamination 110. Back iron apertures 130, located within the back iron portion 124 along slot centerlines, align when stacked to form axial back iron channels 132. Half of these back iron channels 132, consisting of every other back iron channel 132 (and referred to herein as the "odd-numbered" back iron channels), may operate as inlet channels and be directly connected to the inlet manifold 106; the remaining back iron channels 132 may operate as outlet channels and be directly connected to the outlet manifold 108. In any of the interior laminations 110, half of the elongated apertures 122, consisting of every other elongated aperture 122 (and referred to herein as the "even-numbered" elongated tooth apertures) are shaped and positioned such that they form contiguous paths with even numbered back iron channels 132 (the back iron outlet channels) when interior laminations 110 are stacked. Likewise, odd numbered elongated apertures 122 are shaped and positioned such that they form contiguous paths with odd numbered back iron channels 132 (the back iron inlet channels) when interior laminations 110 are stacked.

In the embodiment of FIG. 2A, the number of back iron apertures 130 plus the number of elongated apertures is equal to the number of teeth, and all of the teeth are cooled. In other embodiments, fewer than all of the teeth may be cooled, e.g., every other tooth, or every third tooth may be cooled. In such an embodiment, the number of back iron apertures 130 plus the number of elongated apertures may be an integer fraction of the number of teeth, e.g., there may be ½, ⅓, or ¼ as many apertures that are either back iron apertures or elongated apertures as there are teeth.

Figure 2B:
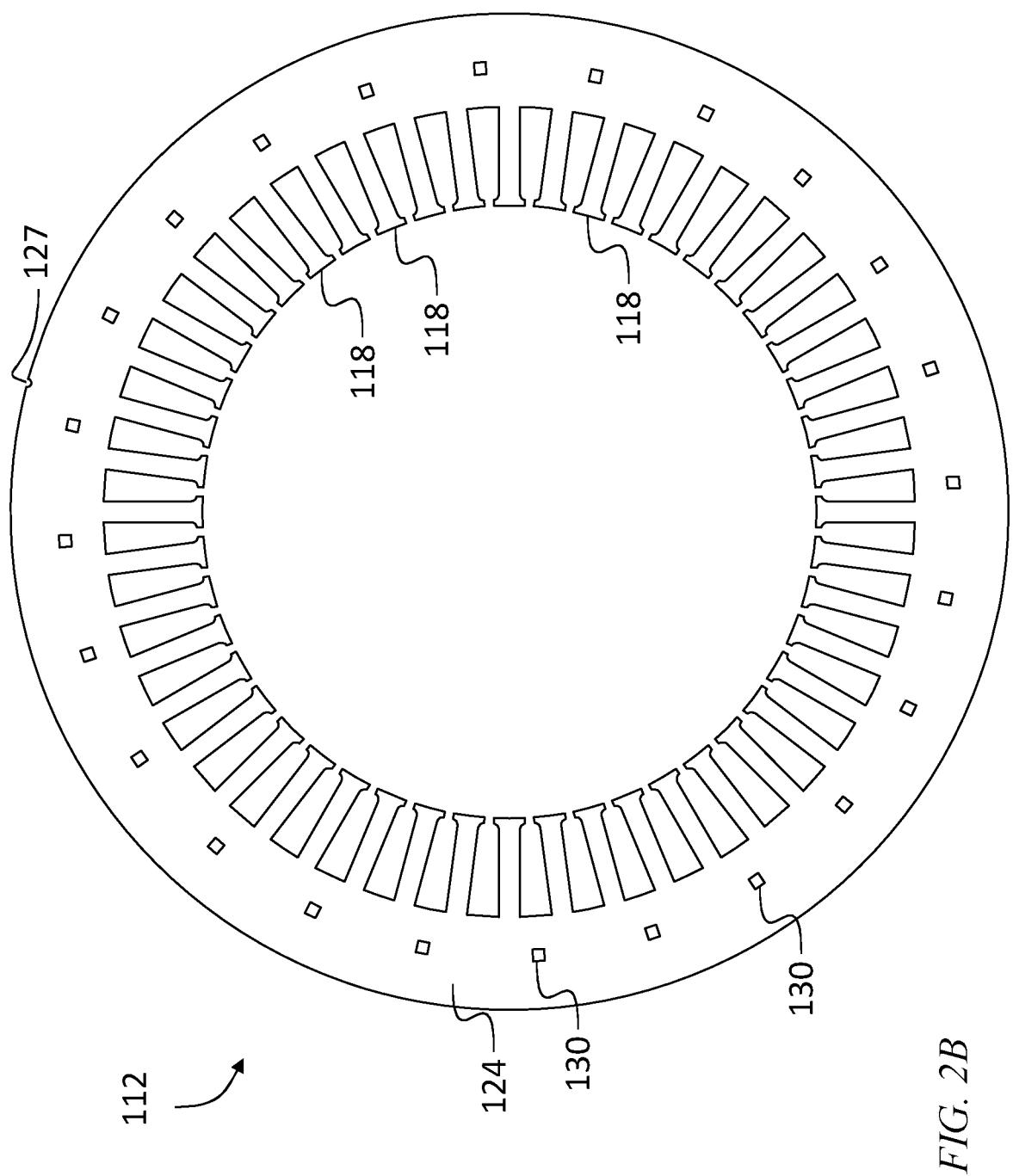
FIG. 2B is a plan view of another stator lamination, according to an embodiment of the present invention.

Referring to FIG. 2B, each end lamination 112 may also include a back iron portion 124 and a plurality of teeth 118, as well as a plurality of back iron apertures 130, of which there may be half as many as the total of the number of back iron apertures and the number of elongated apertures in an interior lamination 110. The end lamination 112 at the inlet end of the stator (referred to herein as the inlet end lamination 112) may be aligned so that the back iron apertures 130 of the inlet end lamination 112 are aligned with the back iron inlet channels. Similarly the end lamination 112 at the outlet end of the stator (referred to herein as the outlet end lamination 112) may be aligned so that the back iron apertures 130 of the outlet end lamination 112 are aligned with the back iron outlet channels. Each of the interior laminations 110 and each of the end laminations 112 may include a witness mark 127 on the outer edge of the lamination.

In one embodiment each back iron aperture 130 (FIGS. 2A-2B) is a 0.10"×0.10" square, and each witness mark 127 (FIGS. 2A-2B) is a 0.050" diameter semi-circle.

Figure 3:
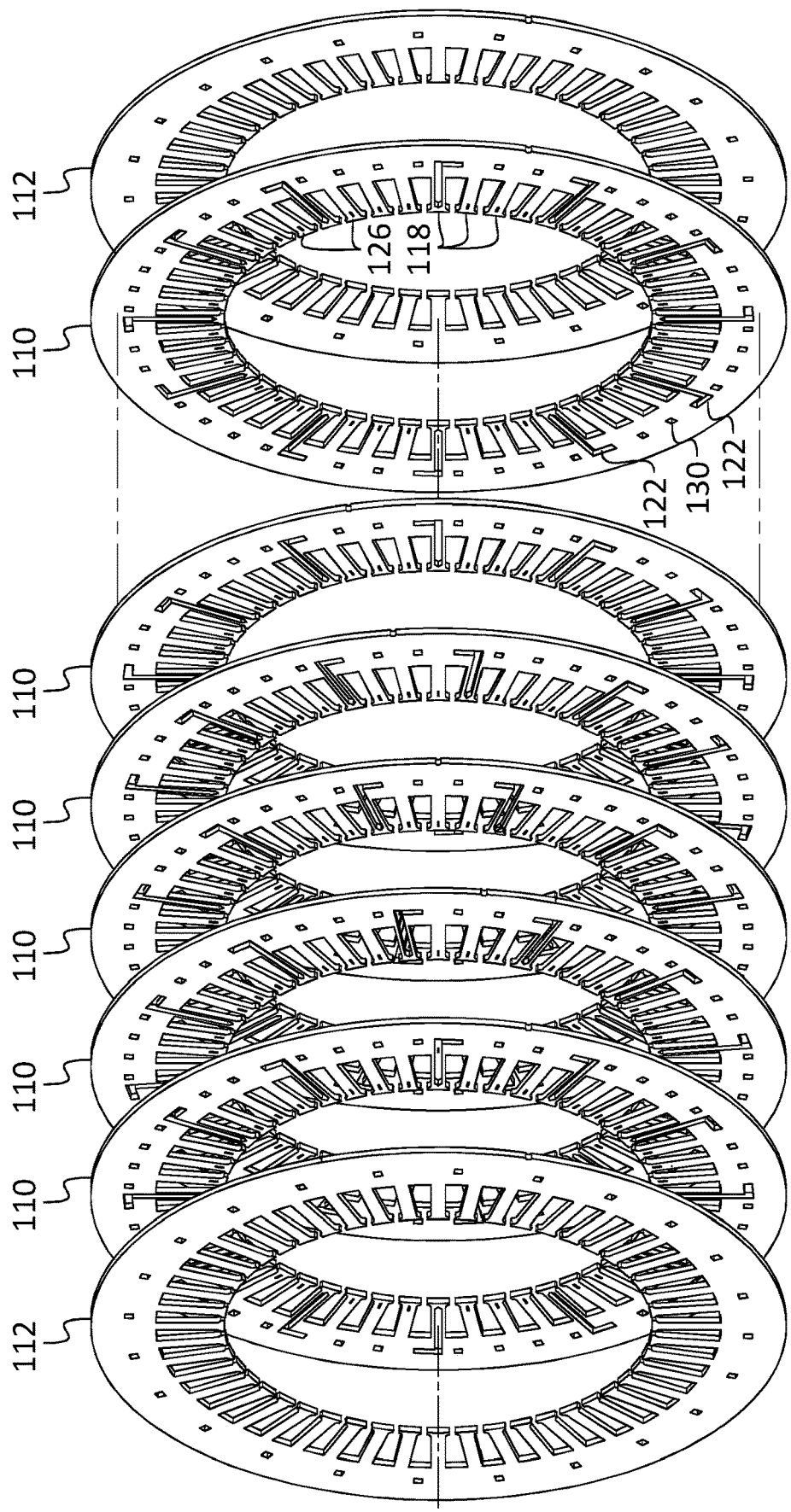
FIG. 3 is a perspective exploded view of a stack of stator laminations, according to an embodiment of the present invention.

FIG. 3 shows the stacking of a plurality of interior laminations 110 between two end laminations 112, in one embodiment. Both odd and even numbered elongated apertures 122 are contiguous with tooth tip channels 128 (FIG. 4B) that are formed by overlapping tooth tip apertures 126. In one embodiment, all interior laminations 110 are identical. For this case, as shown in FIG. 3, stacking may be such that the $j+1^{th}$ lamination is rotated one tooth pitch clockwise (or counter-clockwise) relative to the $j^{th}$ lamination. End laminations 112 serve as inlet and outlet flow directors. As used herein, a "flow director" is a structure that allows fluid to flow into, or out of, some, but not all, of the axial back iron channels in a structure having such channels or the radial back iron channels in a structure (e.g., in an axial gap stator core, discussed in further detail below) having such channels. In the embodiment of FIG. 3, for example, the inlet end lamination allows fluid to flow from the inlet manifold 106 only into the back iron inlet channels, and the outlet end lamination allows fluid to flow into the outlet manifold 108 only from back iron outlet channels. In some embodiments all of the laminations of a stator are the same, and have the configuration of an interior lamination as illustrated in FIG. 2A. In these embodiments a flow director may be, for example, a manifold having internal protrusions in the manifold channel that extend against the surface of (or into the apertures of) an end lamination at some of the apertures (e.g., at all of the tooth tip apertures 126, at all of the elongated apertures 122, and at a subset of the back iron apertures 130) blocking some of the apertures, so that fluid is able to flow into or out of only a set of back iron apertures including half as many apertures as the total number of back iron apertures 130 and elongated apertures 122 of the lamination.

In particular, at the inlet end of stator core 102, a first end lamination 112 (the inlet end lamination) allows cooling fluid to enter odd numbered back iron channels 132 (the back iron inlet channels), while blocking flow to or from the even numbered channels. Likewise at the outlet end of stator core 102, a second end lamination 112 (the outlet end lamination) allows coolant to exit from even numbered back iron channels 132 (the back iron outlet channels), while blocking flow to or from the odd numbered channels. In one embodiment, both of these end laminations, the first end lamination 112, and the second end lamination 112, are identical. The second end lamination 112 is rotated one tooth pitch clockwise (or counterclockwise) relative to the first end lamination 112. Inlet manifold 106 serves to distribute received coolant flow to odd numbered back iron channels 132. Likewise, outlet manifold 108 collects coolant received from even numbered back iron channels 132. In FIG. 3, each of the interior laminations 110 is shown as being rotated by one tooth counterclockwise relative to the preceding lamination, along the length of the stator. In other embodiments the change in orientation of successive laminations may be greater than one tooth, and/or may be clockwise instead of counterclockwise. In some embodiments, some of the interior laminations may not be rotated relative to the adjacent interior laminations. For example, groups of k laminations (where k is a positive integer greater than 1) may be aligned with each other (i.e., not rotated relative to each other), and adjacent groups of k may be rotated relative to each other by one or more teeth. If k is 2, for example, then pairs of interior laminations are aligned, so that each elongated aperture 122 is aligned with a corresponding elongated aperture 122 of the other lamination of the pair, and the two elongated apertures form a radial tooth cooling channel that has an axial width twice as great as the thickness of a lamination.

In some embodiments all of the interior laminations 110 are identical to within manufacturing tolerances. In these embodiments, the witness marks, of the interior laminations 110, on the outer surface of the assembled stator core form a spiral, the witness mark on each lamination being advanced by, e.g., one tooth pitch clockwise or counterclockwise relative to the preceding lamination along the length of the stator core. This may make it possible to verify that the laminations have been assembled correctly by a visual inspection, as, for example, any single lamination that is clocked by the wrong amount relative to its neighbors will have a witness mark that is offset from the spiral formed by the remaining laminations, if they are properly aligned. In other embodiments the interior laminations 110 may have alignment notches in addition to the witness marks, and the alignment notches may be, on each successive lamination, positioned at a different point on the circumference relative to the pattern of elongated apertures 122. The end laminations 112 may also have alignment notches. The alignment notches on the interior laminations 110 and on the end laminations 112 may be placed such that when the interior laminations 110 and the end laminations 112 are correctly assembled as part of the stator core, all of the alignment notches are aligned axially. In this embodiment the interior laminations 110 and the end laminations 112 may be installed in a housing or assembly fixture with a corresponding interior axial ridge to effect and maintain the correct azimuthal alignment while the laminations are bonded together and/or while the stator winding 104 is put in place.

The embodiment of FIG. 3 establishes a large number of parallel coolant paths, each of which starts with coolant received from an axial inlet channel, then through a radially directed tooth channel, followed by a short axial path through the tooth tip channel, and then through a second radial tooth channel to an adjacent back iron outlet channel. In one embodiment, to achieve low thermal resistance between the winding and the core, conventional slot liners may be replaced by a thermally conductive powder coat applied to the core slots, and a thermally conductive potting resin, such as a thermally conductive epoxy may be molded under pressure within all parts of the winding, including the end turn. This combination may provide tight thermal coupling between all parts of the winding and the core; both the active winding elements as well as the end turn may be cooled such that very high current densities may be maintained without any portion of the winding exceeding critical temperature limits. In some embodiments, the interior laminations 110 and the end laminations 112 are bonded together and sealed with a bonding agent or sealing compound that is applied to the surfaces of the laminations prior to assembly or that may be applied to the stator core after it is assembled, and seep into the inter-lamination gaps and set, preventing cooling fluid from leaking out of the stator core through the inter-lamination gaps. In some embodiments the powder coating or the potting resin mentioned above may seal the stator core, in addition to, or instead of, the bonding agent or sealing compound. A scavenge pump 152 (FIGS. 1A and 1B) may be used to recirculate any cooling fluid that escapes from the stator core or from the rotor core. In some embodiments the cooling fluid is a low viscosity oil such as automatic transmission fluid (ATF) or transformer oil. In some embodiments, low thermal impedances may be achieved in this manner between the coolant and the core; furthermore, since cooling of the core teeth is provided, the thermal resistance of the teeth may be virtually eliminated from the overall thermal circuit.

In a three phase machine, the number of teeth and slots may be a multiple of six. Small machines may have as few as six teeth, while large machines may have 60 or more. As the number of teeth is increased, current harmonics may be reduced while heat transfer between the winding and the core may be improved due to the increased interface area and reduced heat flow length. In one embodiment there are $N_t$ teeth ($N_t$ being a positive integer), and the total number of apertures in, or extending into, the back iron (i.e., the total number of back iron apertures 130 and elongated apertures 122) of each of the interior laminations 110 is also $N_t$; half of these serve to form back iron inlet channels and the other half serve to form back iron outlet channels. In each of the interior laminations 110, every $n^{th}$ tooth contains an elongated aperture 122 which serves as a coolant channel. Here, n is a positive integer between 2 and $N_L/2$ that divides evenly into $N_L$. In each of the interior laminations 110, half of the elongated apertures 122 receive coolant from odd numbered back iron channels 132 and carry coolant radially inward (for a radial-gap stator with inward-facing teeth) to the tooth tip channel 128 (FIG. 4B). Coolant then flows axially through this tooth tip channel for a distance equal to n lamination thicknesses and then flows radially outward through an even numbered elongated aperture 122 and on to an even numbered back iron channel 132 and finally flows axially on to the outlet manifold.

In an embodiment with $N_t$ teeth and $N_L$ total interior laminations 110, the approximate number of radial tooth cooling channels (each formed by an elongated aperture 122) is $N_L*N_t/n$. The total wall area associated with these channels may be significant. For example, in one embodiment in which each elongated aperture has an associated wall area of 0.5 $in^2$, $N_L$=600, Nt=48, and n=6, the total fluid contact surface is approximately 0.5*600*48/6=2400 $in^2$ or nearly 17 $ft^2$. The ratio of the volume of the stator core to total fluid contact surface may be less than 1 inch. The section associated with coolant flow is also relatively large, thus enabling relatively low ratios of head loss to flow rate. Heat flow distances may be short—as demonstrated by the above example, in which the maximum heat flow length within the tooth elements may be about 0.10". Tooth tip apertures may be relatively narrow so that magnetic sections are minimally reduced. The cross section of the tooth tip aperture may be made to be about twice the section presented by the radial tooth cooling channel, and, as a result, the head loss due to the tooth tip channel may be relatively small. As n is reduced to provide more elongated apertures, heat transfer may be improved, while magnetic sections may be reduced. This may make it possible to select n such that a desired trade-off criterion is met.

In some embodiments, an analogous set of interior laminations and end laminations are stacked to form a stator core for an "inside-out" motor in which teeth and slots face radially outward. In other embodiments a stator core for a linear machine is formed by stacking suitable analogous laminations.

Figure 4A:
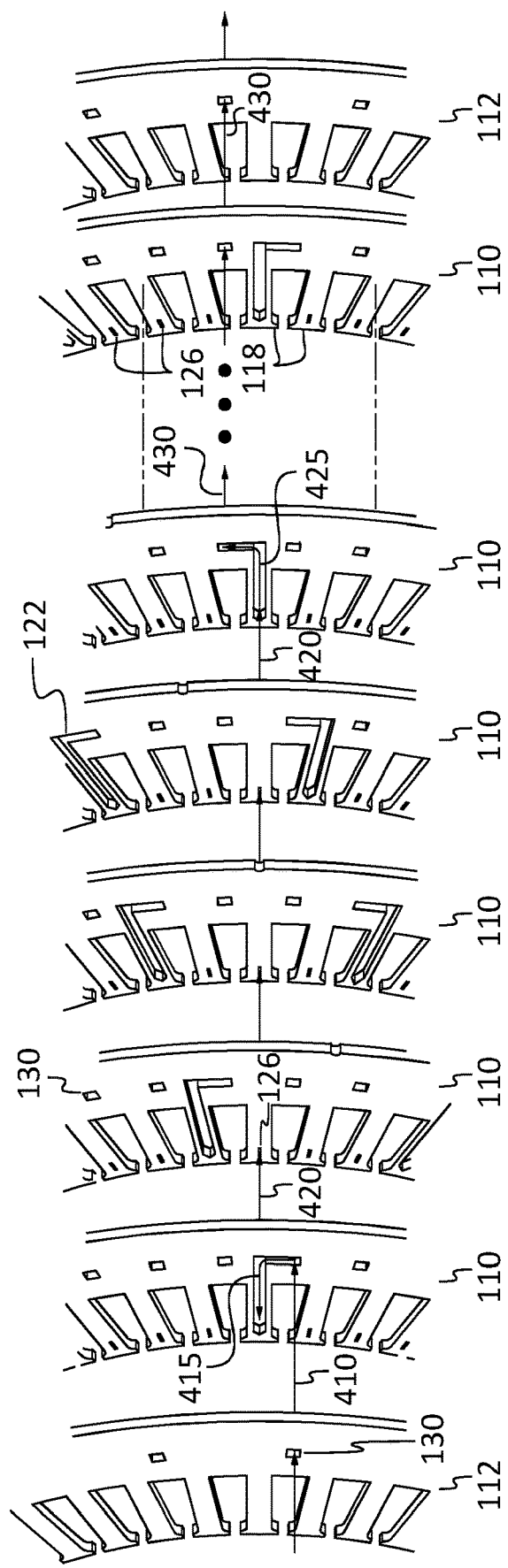
FIG. 4A is a perspective exploded view of a portion of a stack of stator laminations, according to an embodiment of the present invention.
Figure 4B:
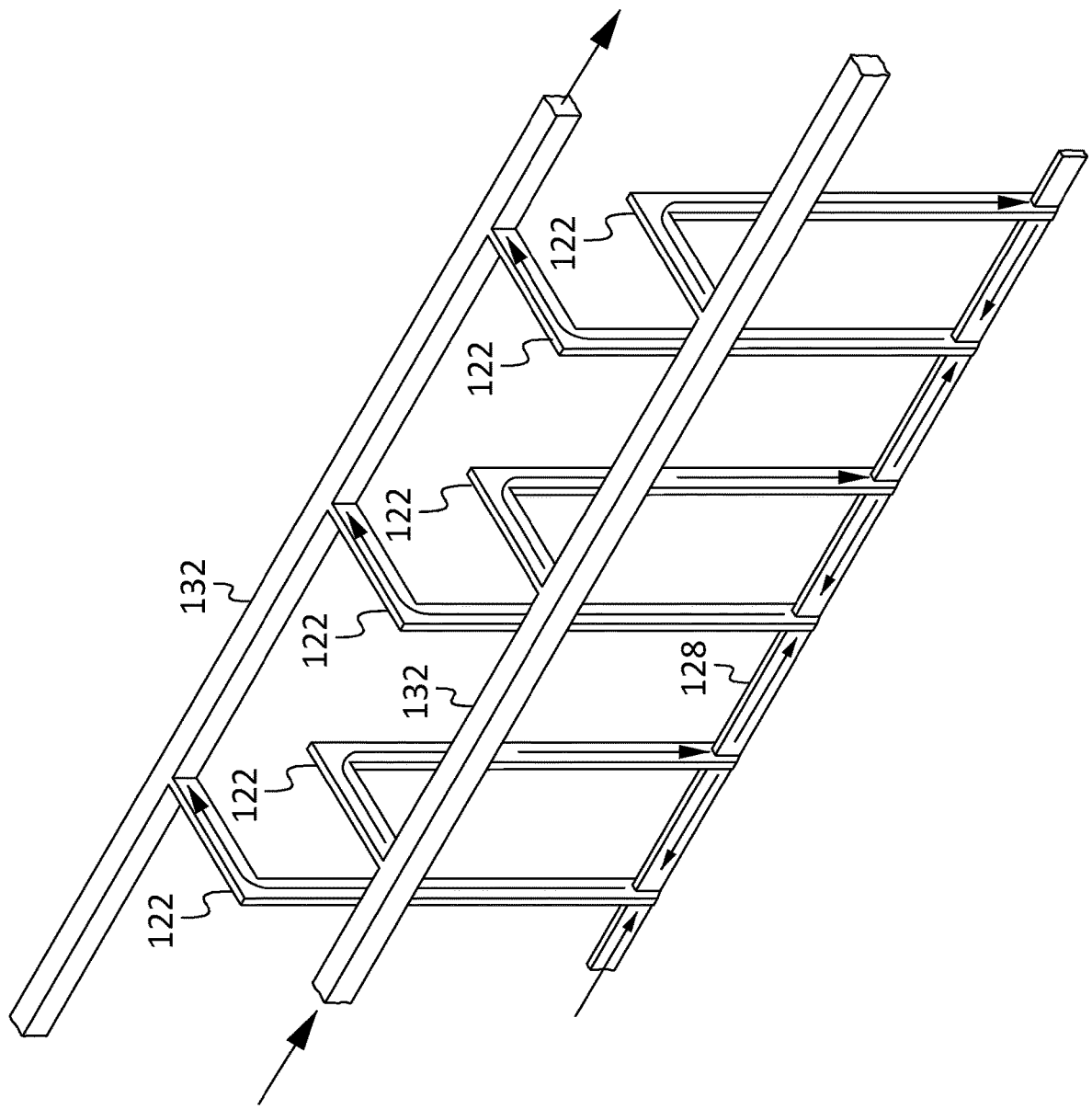
FIG. 4B is a perspective view of a portion of a flow pattern within a stack of laminations, according to an embodiment of the present invention.

A stator core formed by stacking the laminations of FIGS. 2A and 2B may contain a number of parallel fluid paths between the inlet manifold and the outlet manifold, one of which is illustrated in FIG. 4A. The fluid path illustrated includes a first axial portion 410 passing through a back iron aperture 130 in the first end lamination 112, followed by a first L-shaped portion 415 following a first elongated aperture 122 in an interior lamination 110, followed by a second axial portion 420 through a plurality of tooth tip apertures 126, followed by a second L-shaped portion 425, in a second elongated aperture 122, followed by a third axial portion 430 through a plurality of overlapping back iron apertures 130 forming a back iron outlet channel. In FIG. 4B, a plurality of such fluid paths are shown in a perspective view showing two back iron channels 132 including a back iron inlet channel and a back iron outlet channel, a tooth tip channel 128 and six L-shaped channels formed by respective elongated apertures 122. Fluid flows in through the back iron inlet channel and then through any of three parallel paths through respective elongated apertures 122 to the tooth tip channel 128. Within the tooth tip channel 128 fluid flows to the nearest elongated aperture 122 connected to the back iron outlet channel, through the channel formed by that elongated aperture 122 to the back iron outlet channel, and out through the back iron outlet channel. FIG. 4B shows only a relatively small number of channels and fluid paths for clarity; as explained above, in some embodiments a stator core may include a significantly greater number of channels and fluid paths.

Figure 5A:
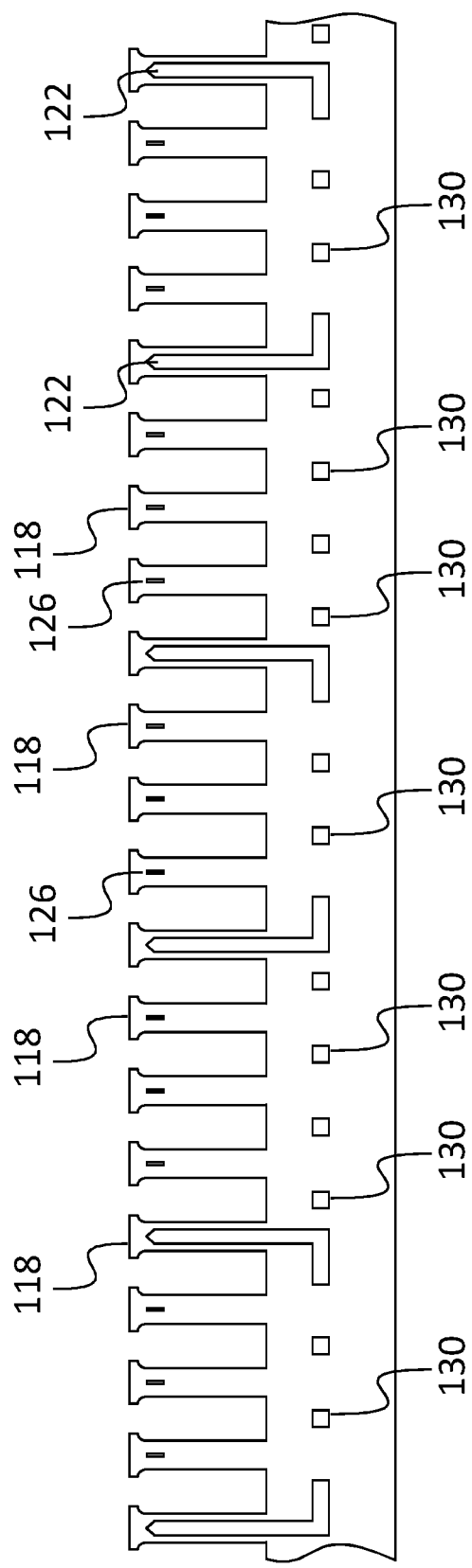
FIG. 5A is a plan view of a portion of a strip before winding, according to an embodiment of the present invention.
Figure 6:
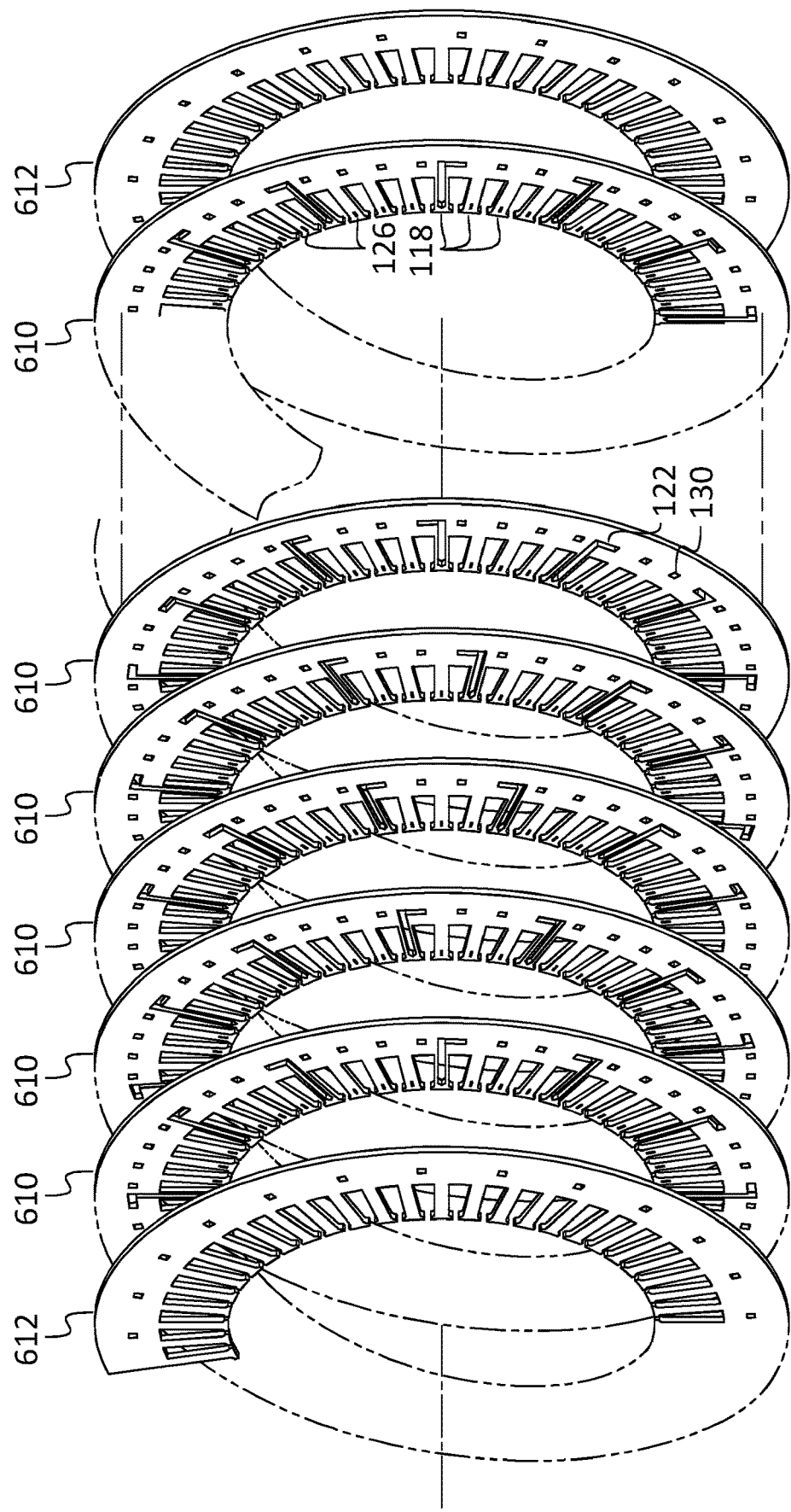
FIG. 6 is an exploded view of a stator core formed from an edge-wound strip, according to an embodiment of the present invention.

In some embodiments, instead of being formed as a stack of laminations, the stator core is formed as an edge-wound strip. As used herein, and "edge-wound" strip has the shape of a SLINKY™, or, on one turn, of a piston ring, the edge-wound strip being a strip with a length, a width, and a thickness, the length being greater than the width, and the width being greater than the thickness, the strip being wound into a helical shape, with the curvature of the strip at every point being parallel to the width direction. Referring to FIG. 5A, the strip prior to winding may have the shape shown along a portion of its length, with teeth that overlap, when the strip is wound, to form the stator core teeth. FIG. 6 is an exploded view of a stator core formed from an edge-wound strip, with successive turns (or "layers") pulled apart axially to make apertures of the inner turns visible. As used herein, a "layer" refers either to a turn of a wound strip or to a lamination of a laminated structure. The operation of the wound strip assembly of FIG. 6 is analogous to that of the assembly of stacked laminations illustrated, for example, in FIGS. 3 and 4A. The strip has a portion (not shown in FIG. 5A) at each of the two ends of the strip (e.g., a portion 48 teeth long, in an embodiment analogous to that of FIGS. 2A-3) that forms the first and last turns 612 of the wound strip and acts as a flow director into or out of either the even-numbered or odd numbered back iron channels 132, each of which is formed by overlapping back iron apertures 130 in the strip. Each of these two portions of the strip may lack tooth tip apertures 126 and elongated apertures 122, and may have back iron apertures 130 spaced twice as far apart as on the remainder of the strip (i.e., back iron apertures 130 separated by twice the tooth pitch).

The remainder of the strip may have tooth apertures and may form the interior turns 610 of the wound strip. The back iron portion of the strip may have notches or slots (e.g., slots on the bottom edge of the strip as shown in FIG. 5A, which may become the outer edge of the strip when wound) to facilitate winding (i.e., to reduce the degree to which the strip must stretch or be compressed when wound). In high pole-count motor, the back iron may be sufficiently narrow that bending may be readily possible without such notches, and the strip may be fabricated without them (as illustrated, for example, in FIG. 5A). In another embodiment, the strip of FIG. 5A may be formed into an edge-wound strip in which the teeth point radially outwards; such a strip may be used as a stator core for an "inside out" radial gap motor in which the stator is inside the rotor. In one embodiment, the notches and apertures of the strip of FIG. 5A are formed while it is being wound (e.g., formed by a suitable punch or set of punches adjacent to a machine used to wind the strip), so that the punching of the features of the strip may be synchronized with the winding of the turns, to preserve alignment between the features of successive turns.

Figure 5B:
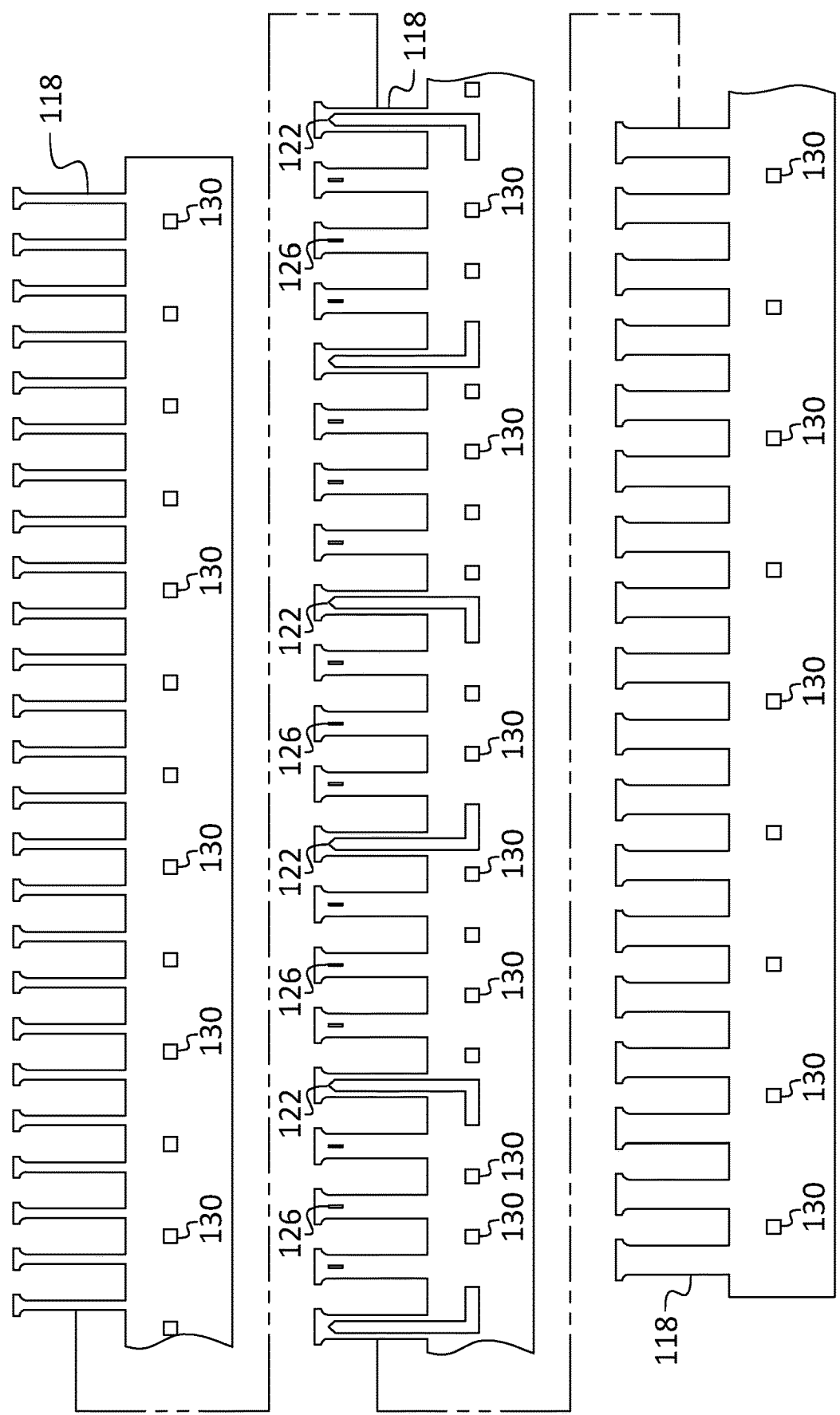
FIG. 5B is a plan view of three portions of a strip before winding, according to an embodiment of the present invention.
Figure 7:
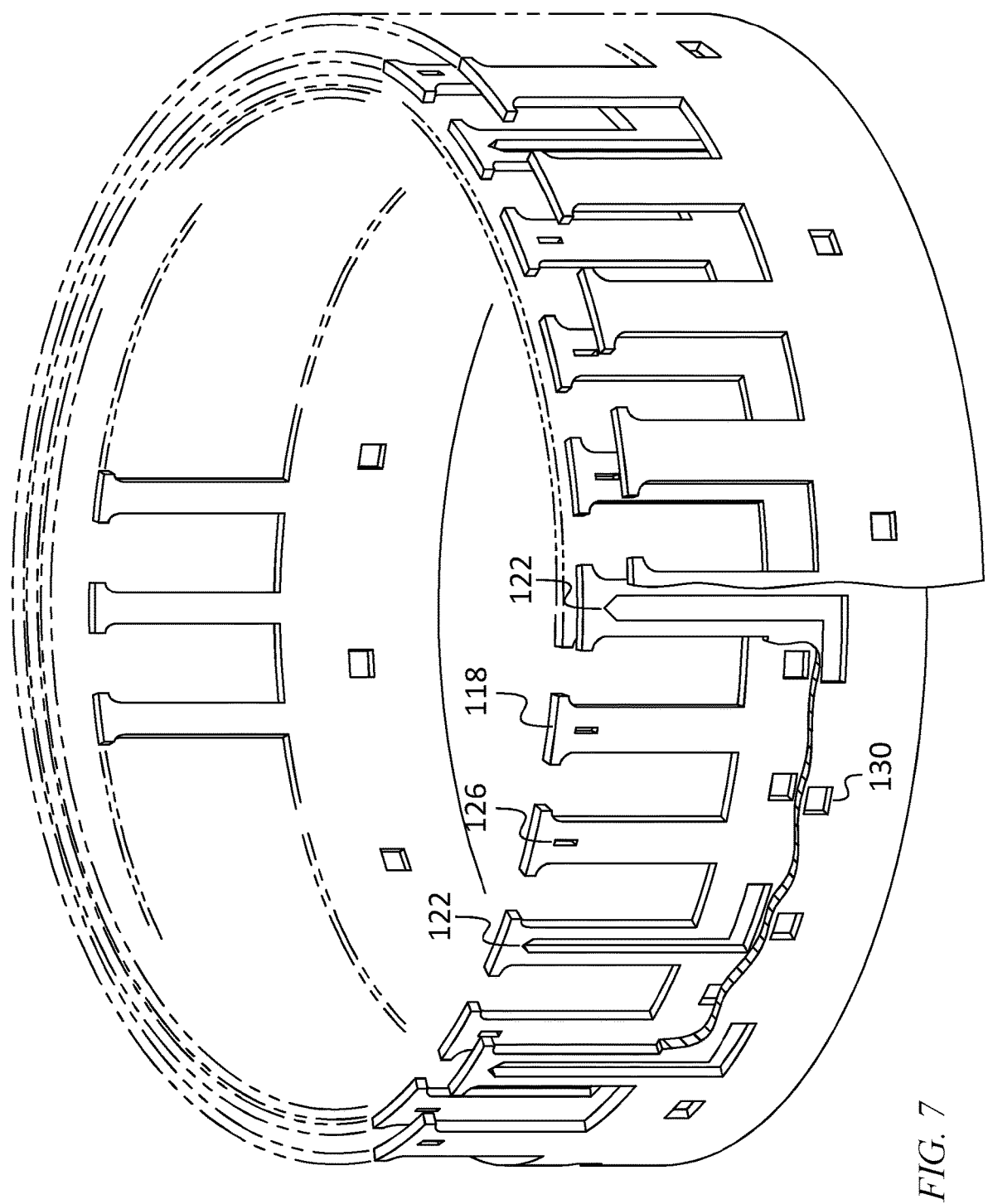
FIG. 7 is an exploded view of a stator core formed from a face-wound strip, according to an embodiment of the present invention.

In another embodiment, a strip illustrated in FIG. 5B may be formed into a face-wound structure illustrated in FIG. 7, which may for example be the stator core of an axial-gap electric machine. Some broken lines are omitted from FIG. 7 for clarity. As used herein, a "face-wound" strip is a structure that has the shape of electrician's tape, being a strip with a length, a width, and a thickness, the length being greater than the width, and the width being greater than the thickness, the strip being wound into a spiral shape, with the curvature of the strip at every point being parallel to the thickness direction. In this embodiment, the pitch of the teeth may increase along the length of the strip (as shown in FIG. 5B), so that as it is wound, the number of teeth on each turn remains constant as the diameter of the partially wound strip increases. The fluid flow in this structure may be analogous to the flow illustrated in FIGS. 4A and 4B, with an exemplary fluid path beginning in an inlet manifold extending around the outside of the structure and feeding radial back iron inlet channels, that include every other one of a set of radial back iron channels. From each back iron inlet channel each of one or more elongated apertures 122 allows fluid to flow azimuthally away from the back iron inlet channel and axially to a respective tooth tip. The fluid then flows radially inward through one or more tooth tip apertures 126, and axially back to the back iron through another elongated aperture 122, connected to an adjacent, radial back iron outlet channel, to a manifold inside the inner diameter of the stator core. In some embodiments the width of the winding slots is constant along the length of the strip, whereas the width of the teeth (and the tooth pitch, as mentioned above) increases. In some embodiments the dimensions of the apertures are constant along the length of the strip; in other embodiments one or more dimensions of one or more of (i) the back iron apertures, (ii) the tooth tip apertures, and (iii) the elongated apertures, vary along the length of the strip (e.g., the apertures may become wider as the teeth become wider).

Figure 8:
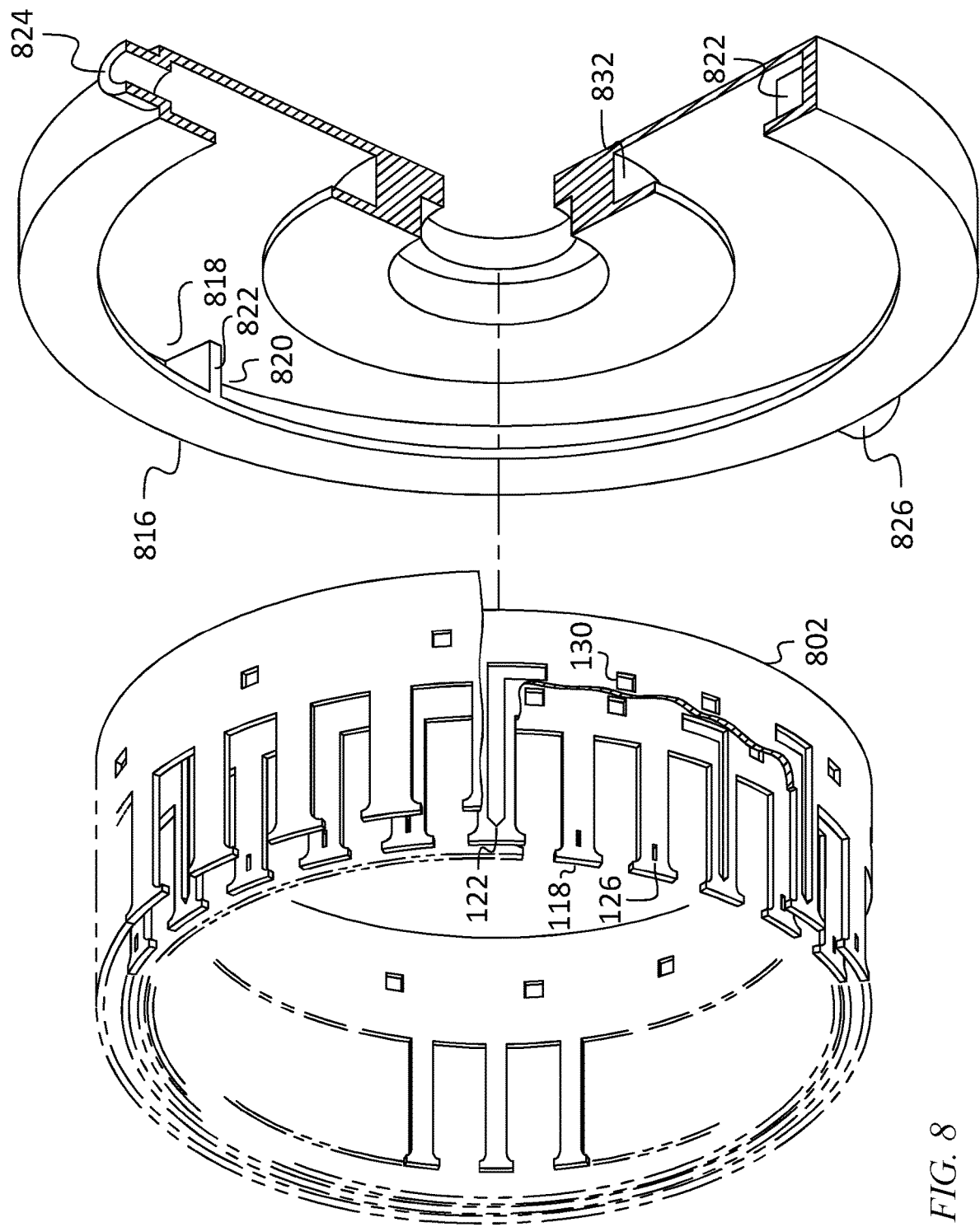
FIG. 8 is an exploded view of a stator core formed from a face-wound strip, along with a manifold structure, according to an embodiment of the present invention.

Referring to FIG. 8, in one embodiment, fluid is supplied to and returned from an axial-gap stator core using a manifold structure 816 that has an inlet port 824 and an outlet port 826 both on the outer surface of the manifold structure (instead of having one of the ports on the inner surface of the manifold structure). The manifold structure 816 may include a first semi-circular outer fluid channel 818 and a second semi-circular outer fluid channel 820, separated by two partitions 822. The first outer fluid channel 818 is fed by the inlet port 824 and acts as the fluid channel of an inlet manifold, and the second outer fluid channel 820 is evacuated by the outlet port 826 and acts as the fluid channel of an outlet manifold. The stator core 802 then operates as two semi-annular halves, a first semi-annular half connected to the inlet port 824 and a second semi-annular half connected to the outlet port 826. Coolant flow is generally radially inward within the first semi-annular half, so that it flows from the first semi-circular outer fluid channel 818 inwards through the first semi-annular half of the stator core, and into an inner fluid channel 832 (formed at the inner diameter of the manifold structure 816). In the inner fluid channel 832 fluid flows azimuthally from the first semi-annular half to the second semi-annular half. The coolant then flows generally radially outward within the second semi-annular half, flowing from the inner fluid channel 832 outward through the second semi-annular half of the stator core to the second outer fluid channel 820, and then to the outlet port 826. One exemplary fluid path in the first semi-annular half of the stator core may include a radial portion along which the fluid flows through the inlet flow director (the outermost turn of the stator core) and through the back iron apertures 130 of several turns of the wound strip (back iron apertures 130 that overlap to form a back iron inlet channel), then through a first elongated aperture 122 axially to the end of a stator tooth, then radially inward (or outward—see FIG. 4B) through one or more stator tooth tip apertures 126, then through a second elongated aperture 122 to the back iron and into a back iron outlet channel (formed by overlapping back iron apertures 130 in several turns of the wound strip), and then radially inward through the back iron outlet channel, to the inner fluid channel 832. In another embodiment the manifold structure may lack the partitions 822 and (instead of having an inlet port 824 and an outlet port 826 both on the outer surface of the manifold structure) have, e.g., an inlet on the outer surface of the manifold structure, and an outlet on the inner surface of the manifold structure.

Figure 9:
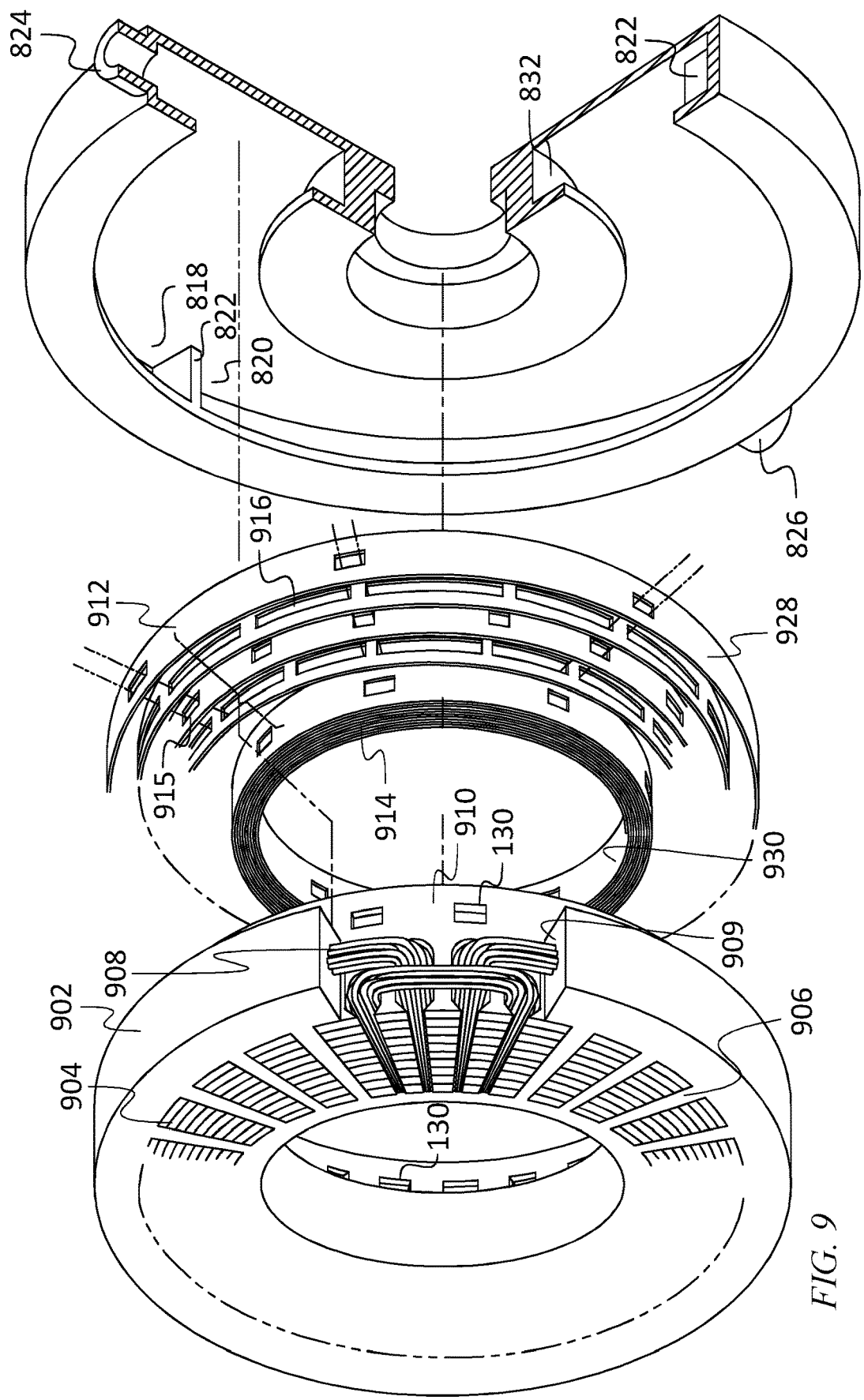
FIG. 9 is an exploded view of a stator core formed from a face-wound strip, along with a manifold structure and end-turn cooling elements, according to an embodiment of the present invention

Referring to FIG. 9, in one embodiment, wound strip end turn cooling structures 912, 914 are used to cool the stator end turns in an axial gap electric machine. An outer cooling structure 912 has a plurality of narrow apertures 915 in every other turn of the wound strip. Successive turns of the outer cooling structure 912 are shown pulled apart radially to make apertures of the inner turns visible. These align to form a set of substantially radial inlet channels alternating with a set of substantially radial outlet channels. Each of the outermost turn 928 and the innermost turn of the outer cooling structure 912 has half as many narrow apertures as the intervening turns with narrow apertures. The apertures of the outermost turn of the outer cooling structure 912 are aligned with the inlet channels and the apertures of the innermost turn of the outer cooling structure 912 are aligned with the outlet channels. Alternating with the intervening turns having narrow apertures 915 are turns having wide apertures 916, each wide aperture bridging two narrow apertures in one or two adjacent turns. Fluid flows through the outermost turn into the inlet channels, then, from each inlet channel, in parallel fluid paths through a plurality of azimuthal channels formed by the long apertures, to the outlet channels, and then radially inward in the outlet channels. The azimuthal channels may provide significant surface area at which heat may be transferred from the surface of the wound strip to the coolant.

The stator 902 of an axial gap electric machine may have a stator core 904 formed of a face-wound magnetic strip, with slots 906 in one face for the stator winding 908. The back iron 910 of the stator 902 may have, as in the embodiment of FIG. 8, back iron apertures 130, and the stator core may also have, on the interior turns or laminations, tooth tip apertures and elongated apertures that overlap with each other to provide fluid paths for stator tooth cooling. The end turns of the stator winding 908 may be encapsulated in a thermally conductive potting resin 909 that may provide a heat flow path from the end turns to the end turn cooling structures 912, 914. In one embodiment the same potting resin is also molded under pressure into the winding slots to fill gaps that otherwise may exist between the conductors of the winding and the layers of the stator core. The thermally conductive potting resin 909 may also seal the stator core 904, to prevent coolant from leaking out of the fluid channels in the stator core 904.

From the outer cooling structure 912 coolant may flow into the stator core, either as a result of the apertures of the innermost turn of the outer cooling structure 912 being aligned with corresponding back channel apertures of the outermost turn of the stator core, or as a result of a gap between the innermost turn of the outer cooling structure 912 and the outermost turn of the stator core. After passing through the stator core, the coolant flows through an inner cooling structure 914 which has a structure analogous to that of the outer cooling structure 912. As in the embodiment of FIG. 8, coolant may be supplied to, and may return from, the combination of the outer cooling structure 912, the stator core 802 and the inner cooling structure 914, by a manifold structure 816 that has an inlet port 824 and an outlet port 826 both on the outer surface of the manifold structure 816. In other embodiments the face-wound structures of FIG. 9 may be replaced with analogous structures formed of cylindrical laminations.

The heat transfer elements 136 of FIG. 1 may be edge-wound or laminated structures analogous to the outer cooling structure 912. For example, a heat transfer element 136 may include first and last laminations that act as inlet and outlet flow directors, and a set of alternating interior laminations of which every other one has narrow apertures and the remaining ones have wide apertures. The narrow apertures may overlap to form alternating inlet and outlet channels, the inlet channels being fed by the inlet flow director (which has half as many apertures as an interior lamination, the inlet flow director apertures being aligned with the inlet channels) and the outlet flow director providing an analogous flow path out of the structure from the outlet channels. Each inlet channel may then be connected to each adjacent outlet channel by a plurality of parallel cooling passages formed by the wide apertures.

In some embodiments, the fluid may flow along paths different from those shown in FIGS. 4A and 4B. For example, fluid may flow axially in each tooth, in a respective tooth tip channel along the entire length of the stator; the channels may be connected to suitable inlet and outlet manifolds at the ends. In another embodiment, the elongated apertures and the corresponding fluid flow may differ from that of FIGS. 4A and 4B in that, after the fluid flows axially along one tooth, it flows radially outward to the back iron, azimuthally to a second tooth, radially inward to the tooth tip, and axially along the tooth tip of the second tooth before returning, via an elongated aperture, to a back iron outlet channel. In another embodiment, fluid may flow, within one lamination, from a back iron channel 132 radially inward to a tooth tip and back out to the back iron, following, for example, a U-shaped aperture within the tooth. In some embodiments the apertures have shapes that differ from those illustrated; the elongated apertures may be curved instead of angular, for example, and the back iron apertures may be round or rectangular instead of square.

Although exemplary embodiments of an electric machine stator with transverse liquid cooled teeth have been specifically described and illustrated herein, many modifications and variations will be apparent to those skilled in the art. Accordingly, it is to be understood that an electric machine stator with transverse liquid cooled teeth constructed according to principles of this invention may be embodied other than as specifically described herein. The invention is also defined in the following claims, and equivalents thereof.

What is claimed is:

1. An electric machine stator having an axis and comprising:
a stator core having a plurality of layers, each of the layers having a back iron portion and a plurality of teeth,
a tooth of the plurality of teeth of a first layer of the plurality of layers having a first aperture forming a first portion of a fluid channel,
wherein the fluid channel includes:
a first segment, the first segment being substantially parallel to the first layer, and the first segment comprising the first portion of the fluid channel;
a second segment, the second segment being substantially parallel to a second layer of the plurality of layers; and
a third segment, the third segment extending through a tooth of a third layer of the plurality of layers,
wherein:

the third layer is between the first layer and the second layer,
the third segment connects the second segment and the first segment,
a fourth layer of the plurality of layers is at one end of the stator core and has no aperture, in any tip of any tooth, that is in fluid communication with the fluid channel,
the stator is configured to interact with a rotor through an air gap, and
the fluid channel is not in fluid communication with the air gap.

2. The electric machine stator of claim 1, wherein a layer adjacent the first layer has an aperture overlapping the first aperture.

3. The electric machine stator of claim 1, wherein the first portion of the fluid channel extends radially within the tooth.

4. The electric machine stator of claim 3, wherein the first portion of the fluid channel has a dimension in an axial direction equal to a thickness of a layer of the plurality of layers.

5. The electric machine stator of claim 1, wherein the first portion of the fluid channel has a first segment in a direction having a radial component with respect to the axis and a second segment in a direction having an azimuthal component with respect to the axis.

6. The electric machine stator of claim 1, wherein
the stator core has a total volume, and the stator core has a plurality of fluid channels, including the fluid channel, having a total fluid contact area,
wherein the total volume divided by the total fluid contact area is less than one inch.

7. The electric machine stator of claim 1, wherein the first layer has a second aperture having a mirror-image shape of the first aperture.

8. The electric machine stator of claim 1, wherein a second layer of the plurality of layers has the same shape as the first layer of the plurality of layers.

9. The electric machine stator of claim 1, wherein the back iron portion of each of the layers has a plurality of second apertures, and wherein the second apertures overlap on adjacent layers to form a plurality of substantially axial fluid passages.

10. The electric machine stator of claim 9, wherein the first aperture overlaps one of the second apertures.

11. The electric machine stator of claim 9, wherein the stator comprises a flow director configured to direct fluid flow into, or receive fluid flow from, a subset of the plurality of substantially axial fluid passages.

12. The electric machine stator of claim 11, wherein the flow director is a layer at one end of the stator core.

13. The electric machine stator of claim 1, wherein the fluid channel includes:
a first axial segment through the back iron portion of a first subset of the plurality of layers;
a first azimuthal segment in the back iron portion of the first layer;
a first radial segment being the first portion of the fluid channel;
a second axial segment extending through a respective tooth of each of a second subset of the plurality of layers;
a second radial segment within a tooth of a second layer of the plurality of layers;
a second azimuthal segment in the back iron portion of the second layer; and a third axial segment through the back iron portion of a third subset of the plurality of layers.

14. The electric machine stator of claim 1, wherein the plurality of layers is a plurality of laminations.

15. The electric machine stator of claim 1, wherein the plurality of layers is a plurality of turns of an edge-wound strip.

16. The electric machine stator of claim 1, wherein the plurality of layers is a plurality of turns of a face-wound strip.

17. The electric machine stator of claim 16, wherein the teeth of the plurality of teeth are narrower at a first end of the strip than at a second end of the strip, and wherein a width of a slot between adjacent teeth at the first end of the strip is the same as a width of a slot between adjacent teeth at the second end of the strip.

18. The electric machine stator of claim 1, wherein each tooth of the plurality of teeth of each of the plurality of layers extends radially inward from the back iron portion.

19. The electric machine stator of claim 1, wherein each tooth of the plurality of teeth of each of the plurality of layers extends radially outward from the back iron portion.

20. The electric machine stator of claim 1, further comprising:
a stator winding; and
an electrically insulating resin having a thermal conductivity greater than about 0.4 W/m/° C.,
wherein the resin fills, with a void fraction less than about 10%, a space between the stator core and the stator winding.

21. The electric machine stator of claim 1, wherein each of the plurality of layers has an aperture, of a plurality of apertures, in a respective tooth,
wherein the plurality of apertures includes the first aperture, and
wherein the plurality of apertures overlap to form a second portion of a fluid channel, the second portion of the fluid channel comprising the first portion of the fluid channel, and the second portion of the fluid channel being substantially axial.

22. The electric machine stator of claim 1, wherein all of the layers of the plurality of layers are identical, and each layer of the plurality of layers is clocked by one tooth pitch relative to an adjacent layer.

23. The electric machine stator of claim 1, further comprising:
a first substantially axial fluid passage extending at least one half the length of the stator, and being obstructed at a first end of the stator,
a second substantially axial fluid passage extending at least one half the length of the stator, and being restricted at a second end of the stator, opposite the first end,
the fluid channel forming a connection between the first substantially axial fluid passage and the second substantially axial fluid passage.

24. The electric machine stator of claim 1, wherein the layers abut against each other.

25. An electric machine comprising:
a rotor having an axis of rotation; and
a stator having an axis, the axis of the stator being the axis of rotation of the rotor, the stator being separated from the rotor by and air gap and having:
a stator core having a plurality of layers, each of the layers having a back iron portion and a plurality of teeth,
a tooth of the plurality of teeth of a first layer of the plurality of layers having a first aperture forming a first portion of a fluid channel,
wherein the fluid channel includes:
a first segment, the first segment being substantially parallel to the first layer, and the first segment comprising the first portion of the fluid channel;
a second segment, the second segment being substantially parallel to a second layer of the plurality of layers; and
a third segment, the third segment extending through a tooth of a third layer of the plurality of layers,
wherein:
the third layer is between the first layer and the second layer,
the third segment connects the second segment and the first segment,
a fourth layer of the plurality of layers is at one end of the stator core and has no aperture, in any tip of any tooth, that is in fluid communication with the fluid channel, and
the fluid channel is not in fluid communication with the air gap.

26. An electric machine comprising:
a rotor;
a stator having a stator core having a plurality of layers, each of the layers having a back iron portion and a plurality of teeth;
channel means for channeling a fluid through the teeth of the stator core; and
pumping means for supplying the fluid to the channel means,
a tooth of the plurality of teeth of a first layer of the plurality of layers having a first aperture forming a first portion of a fluid channel,
wherein the fluid channel includes:
a first segment, the first segment being substantially parallel to the first layer, and the first segment comprising the first portion of the fluid channel;
a second segment, the second segment being substantially parallel to a second layer of the plurality of layers; and
a third segment, the third segment extending through a tooth of a third layer of the plurality of layers,
wherein:
the third layer is between the first layer and the second layer,
the third segment connects the second segment and the first segment,
a fourth layer of the plurality of layers is at one end of the stator core and has no aperture, in any tip of any tooth, that is in fluid communication with the fluid channel,
the stator is configured to interact with the rotor through an air gap, and
the fluid channel is not in fluid communication with the air gap.

* * * * *